United States Patent [19]

Abramovich

[11] Patent Number: 5,801,895
[45] Date of Patent: Sep. 1, 1998

[54] DISK DRIVE SERVO DEMODULATION SYSTEM WHICH SUPPRESSES NOISE ON THE POSITION ERROR SIGNAL

[75] Inventor: Daniel Y. Abramovich, Palo Alto, Calif.

[73] Assignee: Hewlett Packard Company, Palo Alto, Calif.

[21] Appl. No.: 653,898

[22] Filed: May 28, 1996

[51] Int. Cl.$^6$ ............................................. G11B 5/596
[52] U.S. Cl. .......................... 360/77.08; 369/44.26; 360/77.04
[58] Field of Search ................ 360/77.02, 77.04, 360/77.07, 77.08, 78.14; 369/44.26

[56] References Cited

U.S. PATENT DOCUMENTS

| | | | |
|---|---|---|---|
| 4,488,188 | 12/1984 | Hansen et al. | 360/77 |
| 4,633,187 | 12/1986 | Nishimura et al. | 329/50 |
| 4,871,974 | 10/1989 | Davis et al. | 329/345 |
| 5,301,072 | 4/1994 | Wilson | 360/77.01 |
| 5,343,340 | 8/1994 | Boutaghou et al. | 360/77.08 |

OTHER PUBLICATIONS

Hiroaki Yada and Toru Takeda, "A Coherent Maximum Likeihood Head Position Estimator for Perm Disk Drives", APMRC '95, Nov. 29–Dec. 1, 1995, FB–04–1–FB–04–1.

A. J. Betts, "Null Servo Pattern", IBM Technical Disclosure Bulletin, vol. 18, No. 8, Jan., 1976, pp. 2656–2657.

G. Tyson Tuttle, "A 130 Mb's PRML Read/Write Channel with Digital–Servo Detection", ISSCC '96, Feb. 8, 1996, pp. 48–49/64–65.

J. M. Mendel, Lessons in Digital Estimation Theory:, pp. 89–99, Prentice Hall, 1987.

*Primary Examiner*—Andrew L. Sniezek
*Attorney, Agent, or Firm*—Brian R. Short

[57] ABSTRACT

A disk drive servo system which provides a position error signal with an increased signal to noise ratio. Mixing waveforms are generated for mixing with dibit burst signals created when a transducer on a recording head of a disk drive magnetically couples to reference position dibits located on a magnetic surface of the disk drive. The mixing waveforms are formed from a finite integer number of sine waves which are coherent with the dibit burst signals. The mixed dibit burst signal are integrated and summed to create the position error signal. Customizing the mixing waveforms allows the signal to noise ratio of the position error signal to be maximized when a magneto-resistive transducer within the disk drive servo system has one of several non-ideal characteristics.

12 Claims, 19 Drawing Sheets

DISK DRIVE SERVO DEMODULATION SYSTEM WHICH SUPPRESSES NOISE ON THE POSITION ERROR SIGNAL

FIELD OF INVENTION

This invention relates generally to magnetic disk drives. In particular, it relates to a disk drive servo demodulation system that suppresses noise on an error signal that controls the position of a transducer that is magnetically coupled to the disk drive.

BACKGROUND

A servo system within a disk drive recording system controls the radial position of a transducer over the center of a preselected track on the disk. This is generally done as the transducer reads position information from the track as the disk rotates.

FIG. 1 shows a rotatable disk 4. Reference position dibits 6 are located proximate to a recording track 8 on the surface of the disk 4 that a transducer 10 is following. For an embedded or sectored servo system, position information is obtained from the reference position dibits 6 placed at predetermined locations on the recording tracks of the rotatable disk 4. The position information is then used to develop a position error signal. The position error signal is then fed back through a compensator to a drive motor attached to a transducer actuator that moves the transducer 10 in a direction to reduce the position error signal.

Interleaving the position information provides position information at sampled intervals. The time between the sampled intervals (sampling rate) is determined by the spacing of the position information on the tracks and by the speed that the magnetic recording surface is moving.

As the track density increases, the maximum tolerable tracking error decreases. The tracking error can be reduced by increasing the position reference information sampling rate. However, the signal to noise (S/N) ratio of the position error signal becomes more critical as the track density and the position sample rate increases.

FIG. 2 is a block diagram of a prior art disk drive servo system. A transducer 10 reads the position information from the surface of the disk and generates a dibit burst signal. The dibit burst signal includes an A burst, which results if the transducer 10 passes by an A bit magnetization pattern that resides on one side of the track the transducer 10 is following, and a B burst, which results if the transducer 10 passes by a B bit magnetization pattern that resides on the other side of the track the transducer 10 is following. Typically, in amplitude encoded servos, the A burst occurs before or after but not simultaneously to the B burst. If the transducer is centered on the track, then the A burst and the B burst are equal in amplitude. If the transducer is not centered on the track then either the A burst or the B burst will be greater in amplitude depending upon which side of the track the transducer is on.

In a null encoded burst pattern servo system, the transducer simultaneously passes the A bit magnetization pattern and the B bit magnetization pattern. If the transducer is centered on the track the transducer is following, then the signals produced by the transducer passing the A bit magnetization pattern and the B bit magnetization pattern cancel each other. If the transducer is not centered on the track, then either the signal produced by the A bit magnetization pattern of the B bit magnetization pattern will be greater in amplitude. However, only a single burst which is the differential of the A burst and the B burst is observed at the output of the transducer.

The disk drive servo system shown in FIG. 2 is called a "peak detection" servo demodulator system. A first rectifier 12 rectifies the A burst of the dibit signal. A second rectifier 13 rectifies the B burst of the dibit signal. The signal at the output of the first rectifier 12 has both a D.C. component and frequency components at multiples of the frequency of the A burst. The signal at the output of the second rectifier 13 has both a D.C. component and frequency components at multiples of the frequency of the B burst. A first peak detector 14 receives the output of the first rectifier 12 and holds the peak value of the rectified A burst. A second peak detector 15 receives the output of the second rectifier 13 and holds the peak value of the rectified B burst.

To generate an error signal for the position of the transducer 10 with respect to the track that the transducer 10 is following, the peak detected and rectified A burst must be compared with the peak detected and rectified B burst. The A burst and the B burst occur at different times. Therefore, a first hold circuit 16 and a second hold circuit 17 are required to synchronize in time the peak detected A burst and the peak detected B burst. A comparator circuit 18 generates a position error signal from the synchronized peak detected signals. The position error signal drives an actuator 19 which controls the position of the transducer 10.

The disk drive servo system shown in FIG. 3 is a rectify and integrate servo demodulator system. This disk drive servo system is typically called "area detection" servo demodulation. For this system, a first integrator 20 integrates the output of the first rectifier 12 and a second integrator 21 integrates the output of the second rectifier 13.

Generally, the area detection servo demodulation system is less susceptible to additive white noise than the peak detection demodulation system. The integrators 20, 21 average any noise present at the outputs of the rectifiers 12, 13 whereas the peak detectors 14, 15 of the peak detection demodulation system detect the highest amplitude of the combined signal and noise at the outputs of the rectifiers 12, 13.

The prior art disk drive servo systems shown in FIG. 2 and FIG. 3 are inexpensive and easy to implement. However, the (S/N) of the position error signal of a disk drive servo system must increase as track densities increase. When the dibit signal bursts are rectified and filtered, significant amounts of useful signal energy are lost. As a result, the S/N of the position error signal of the prior art disk drive servo systems is inherently limited.

The transducer 10 is typically a magneto-resistive (MR) transducer or inductive transducer. MR transducers will often have several non-ideal characteristics which affect the level and accuracy of the position error signal. The prior art disk drive servo systems can not compensate for these non-ideal characteristics and will introduce noise on the position error signal as a result.

There is a need for a disk drive servo system which suppresses the noise of the position error signal. The servo system should be easy to implement and adaptable for minimization of the effects of several non-ideal characteristics that commonly occur in the MR transducers which are often used to form disk drive servo systems.

SUMMARY OF THE INVENTION

The present invention provides a disk drive servo system which suppresses noise on the position error signal. The servo system can be optimized to allow the system to operate more effectively than an existing disk servo system if a transducer within the disk drive servo system exhibits non-ideal characteristics. A system according to the invention can be implemented with a mixture of analog and digital electronics depending upon the desired level of performance and cost.

An embodiment of this invention is a magnetic recording device that includes a disk rotatably mounted on the device. The disk has a surface that contains recording tracks each comprising a plurality of first reference position dibits at selected positions on the track and a plurality of second reference position dibits at selected positions on the track. A transducer is coupled to the surface for producing a first dibit burst signal and a second dibit burst signal as the transducer passes by the first reference position dibits and the second reference position dibits. The amplitude of the first dibit burst signal and the second dibit burst signal is dependent on the position of the transducer with respect to a track. The system generates a first mixing signal which comprises a finite integer number of sinusoids coherent with the first dibit burst signal. The system generates a second mixing signal which comprises a finite integer number of sinusoids coherent with the second dibit burst signal. A first frequency mixer multiplies the first mixing signal and the first dibit burst signal and generates a first multiplied output. A second frequency mixer multiplies the second mixing signal and the second dibit burst signal and generates a second multiplied output. The first multiplied output is integrated over an integer number of cycles generating a first error signal. The second multiplied output is integrated over an integer number of cycles generating a second error signal. A comparator compares the amplitudes of the first error signal and the second error signal and generates a position error signal. A moveable actuator moves the transducer to different radial locations with respect to the track. An actuator controller receives the position error signal and controls the moveable actuator to maintain the transducer position with respect to the recording track.

Other aspects and advantages of the present invention will become apparent from the following detailed description, taken in conjunction with the accompanying drawings, illustrating by way of example the principles of the invention.

DETAILED DESCRIPTION

Figure 1:
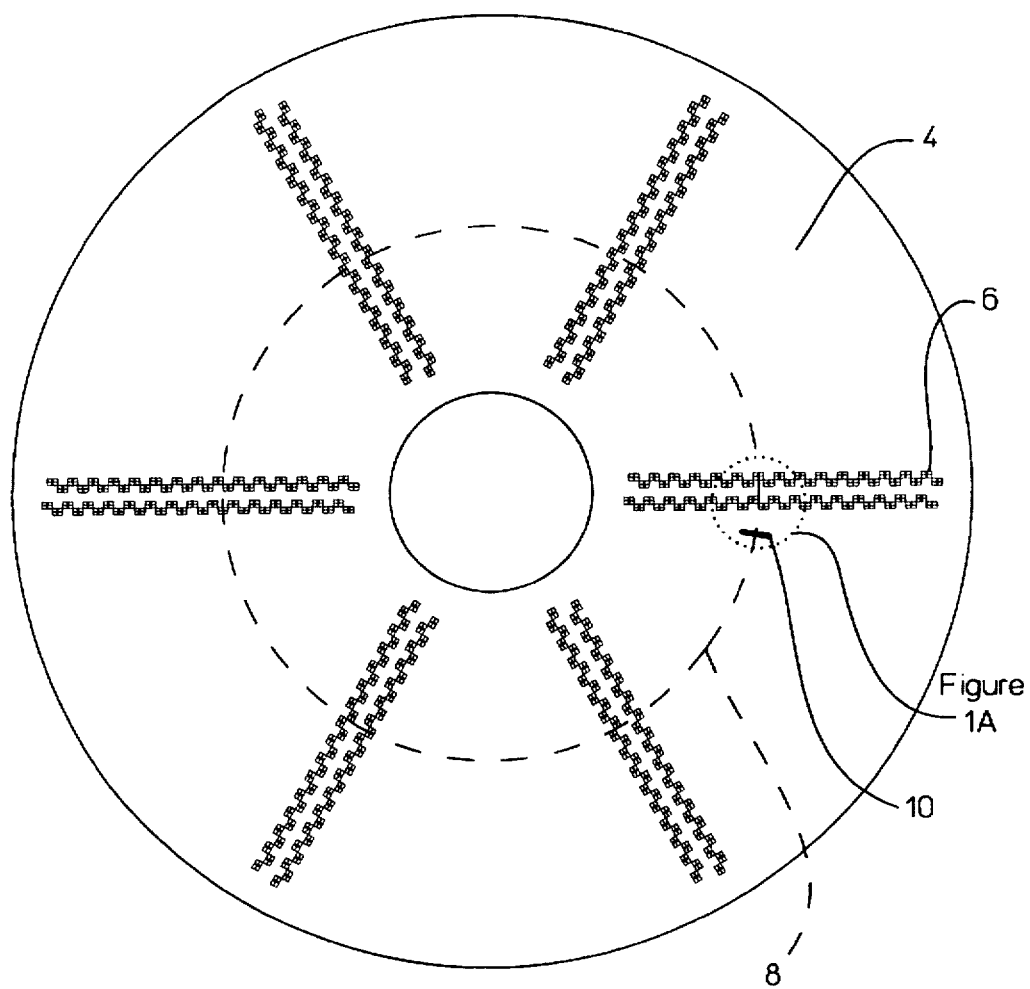
FIG. 1 shows reference position dibits located proximate to a recording track on the surface of the disk that a transducer is following.
Figure 1A:
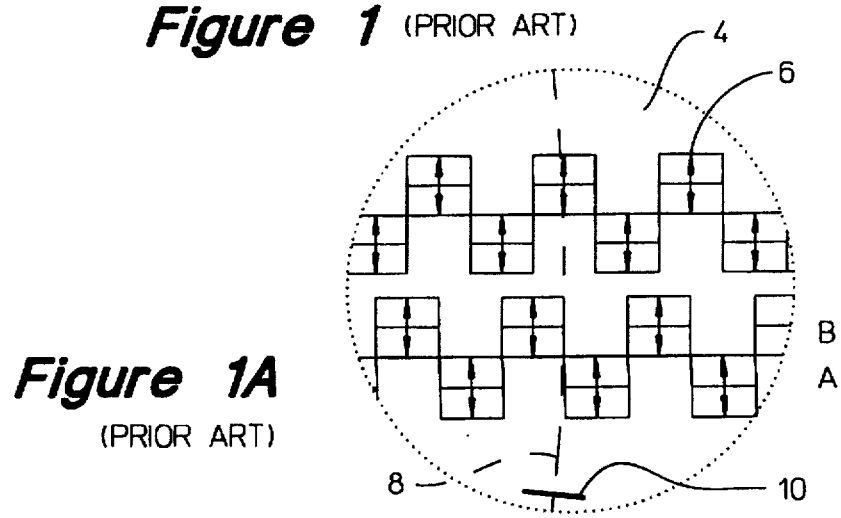
Figure 2:
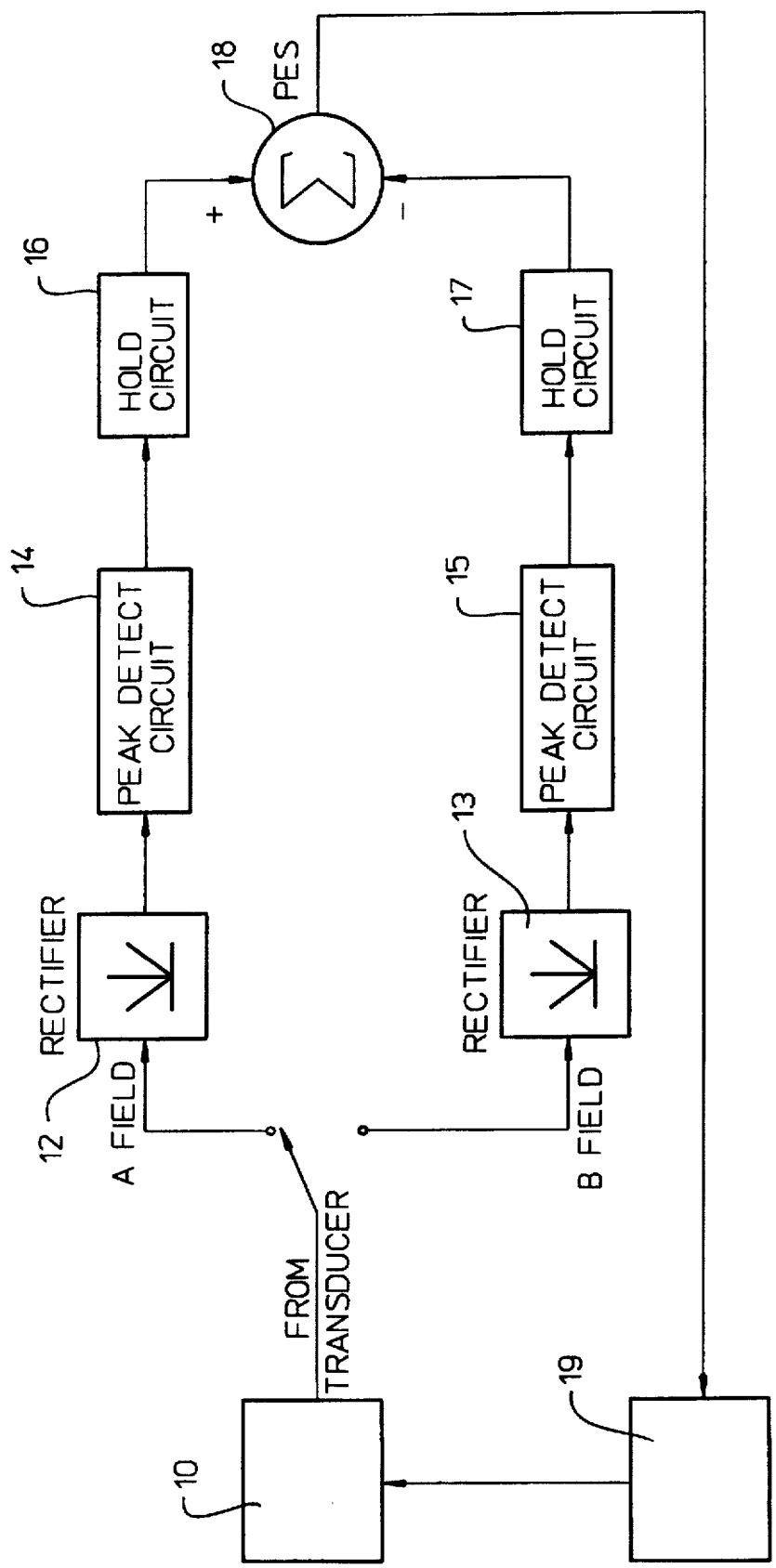
FIG. 2 is a block diagram of a prior art peak detection disk drive servo demodulation system.
Figure 3:
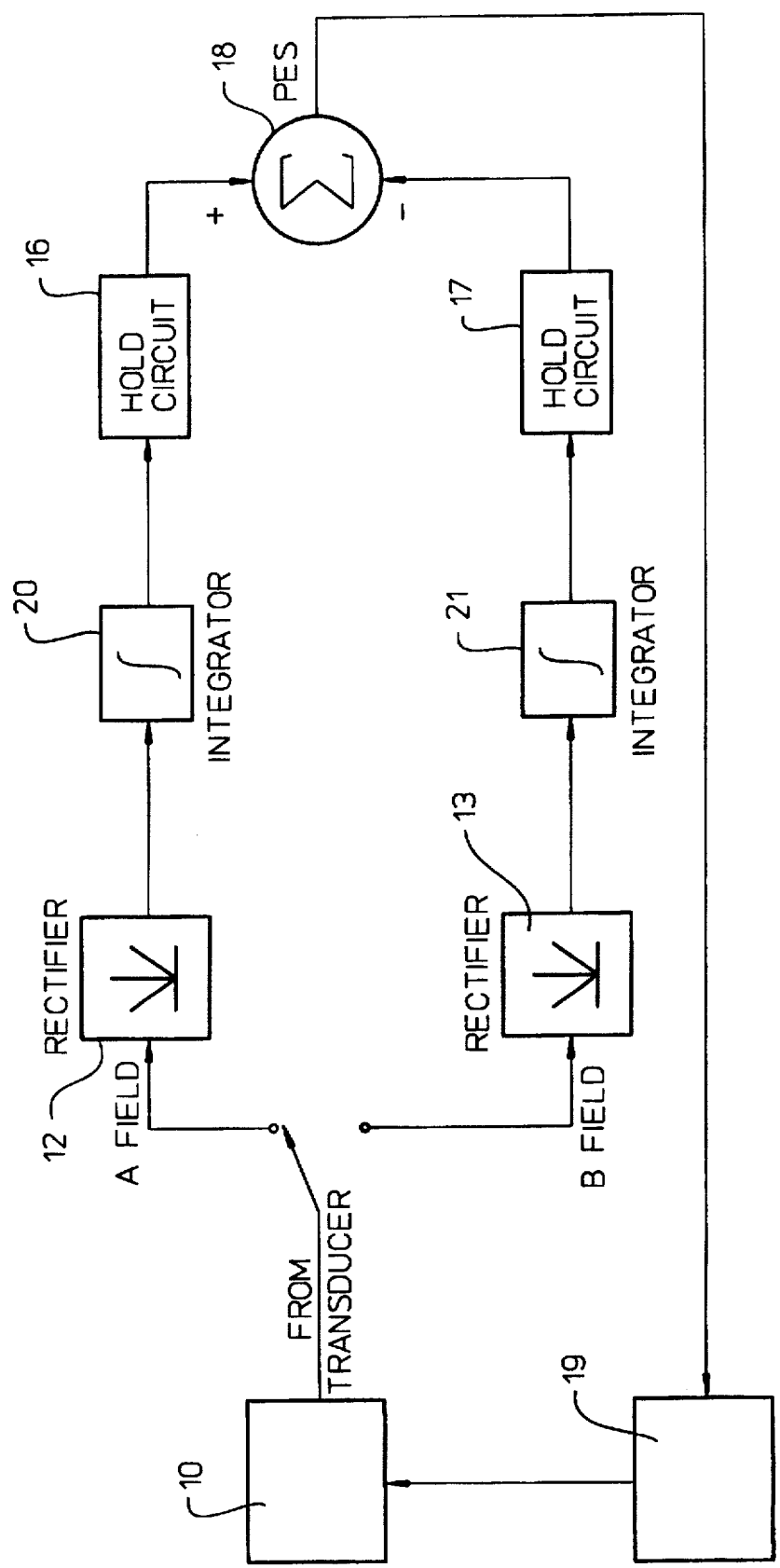
FIG. 3 is a block diagram of a prior art rectify and integrate disk drive demodulation system.

As shown in the drawings for purposes of illustration, the invention is embodied in a disk drive servo system that suppresses noise on the position error signal controlling the position of the recording head over the disk of the disk drive system. As track densities on the disk increase, the maximum allowable tracking error of the recording head with respect to the track from which the recording head is reading information decreases. Noise on the position error signal can affect the tracking error of the recording head. Therefore, as track densities on the disk increase, the noise on the position error signal must decrease.

The disk drive servo system of this invention can reduce tracking errors that can occur when the transducer reading the position information exhibits any one of several non-ideal characteristics. These non-ideal characteristics and their effect on the noise within the servo system of a disk drive will be discussed in detail later.

The disk drive servo system of this invention can be implemented with either digital electronic components, analog electronic components, or a mixture of both digital and analog electronic components. This flexibility allows the performance of the disk drive servo system to be optimized and the cost of the disk drive servo system to be minimized. The optimal configuration is probably a mixture of both digital and analog electronic components.

Figure 4:
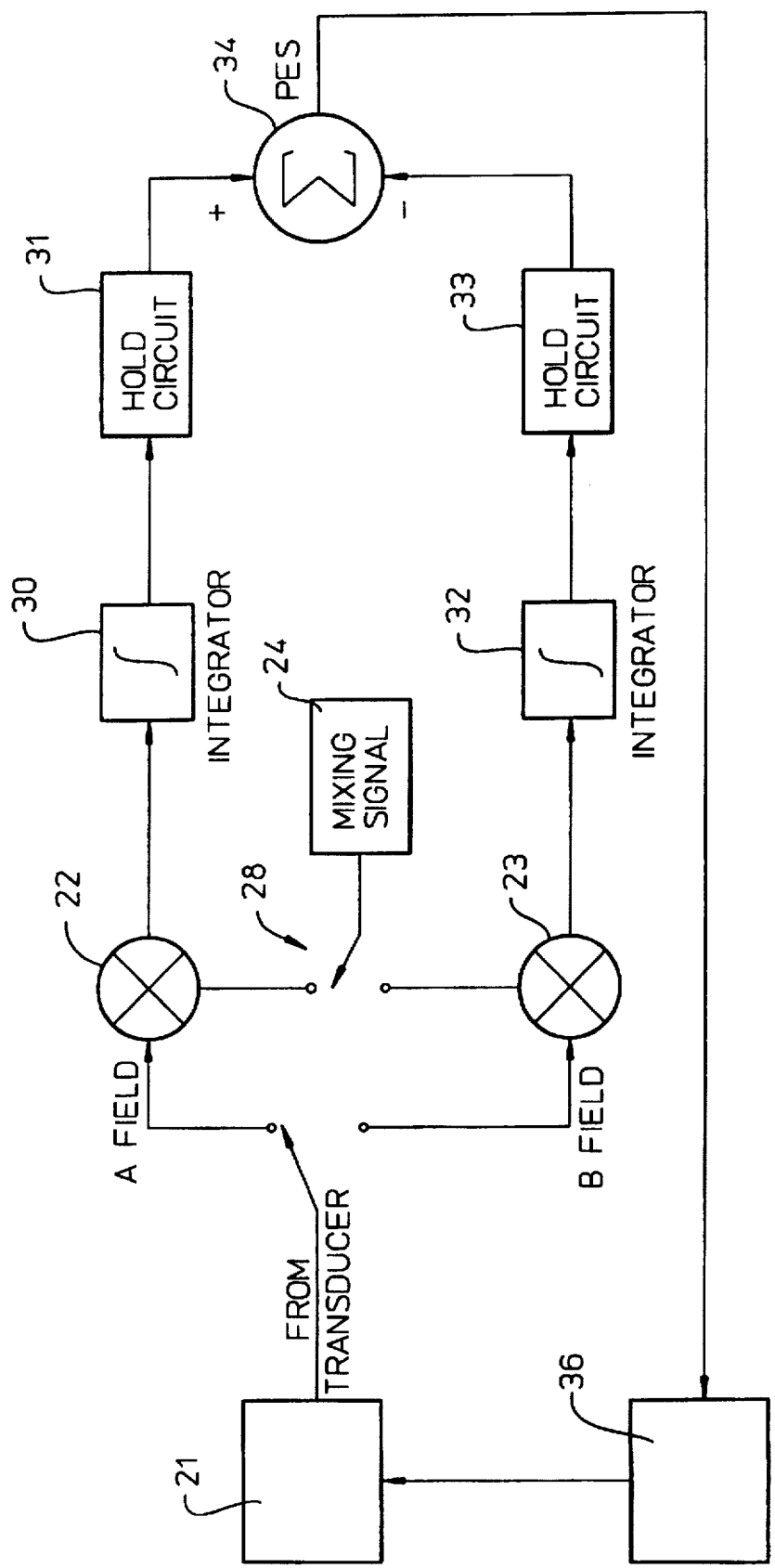
FIG. 4 is a block diagram of the synchronous servo demodulation system of this invention.

FIG. 4 shows a block diagram of the synchronous demodulation servo system of this invention. The rectifiers of the prior art have been replaced with a pair of mixers 22, 23 and a mixer signal generator 24 has been added. The mixer signal generator 24 is capable of producing a customized signal that optimizes the performance of the servo demodulation system.

A transducer 21 reads the position information from the surface of the disk and generates a dibit burst signal. The dibit burst signal includes an A burst resulting as the transducer 21 passes by an A bit magnetization pattern which resides on one side of the track the transducer 21 is following, and a B burst resulting as the transducer 21 passes by a B bit magnetization pattern which resides on the other side of the track the transducer 21 is following. In a standard amplitude encoded burst pattern servo system, the A burst occurs before or after but not simultaneously to the B burst. If the transducer is centered on the track, then the A burst and the B burst are equal in amplitude. If the transducer is not centered on the track then either the A burst or the B burst will be greater in amplitude depending upon which side of the track the transducer is on. In a null servo pattern, the A burst and the B burst occur simultaneously. This invention applies to both the standard amplitude servo system and the null encoded burst pattern servo system. However, the discussions of the invention will be directed to the standard amplitude servo system.

A pair of switches 26, 28 are configured and controlled so that a first mixer 22 receives the A burst signal and a second mixer 23 receives the B burst signal. The first mixer 22 multiplies the A burst signal with a first coherent mixer signal generated by the mixer signal generator 24. The first coherent mixer signal comprises a finite integer number of sine waves in which each sine wave is coherent with the A burst signal. The coherence of the sine waves can be ensured by phase locking the mixer signal generator 24 with the A burst signal. The second mixer 23 multiplies the B burst signal with a second coherent mixer waveform generated by the mixer signal generator 24. The second coherent mixer signal comprises a finite integer number of sine waves in which each sine wave is coherent with the B burst signal. The coherence of the sine waves can be ensured by phase locking the mixer signal generator 24 with the B burst signal.

The mixer signals generated by the mixer signal generator 24 are generally a near ideal replication of the dibit burst signals. The mixer signals are not ideal or exact replications of the dibit burst signals because the mixer signals comprise only a finite number of coherent sine waves or cosine waves. An exact replication of the dibit burst signals requires an infinite number of coherent sine waves or cosine waves. The mixer signals, however, can be configured to optimize the servo system upon the occurrence of any number of possible non-ideal characteristics of the MR transducer within the servo loop.

A first integrator 30 integrates the output of the first mixer 22. The first integrator 30 is implemented to integrate an integer number of burst signal cycles so that the frequency components of the first mixer output integrate to zero. The output of the first integrator 30 represents the DC signal component of the output of the first mixer 22.

A second integrator 32 integrates the output of the second mixer 23. The second integrator 32 is implemented to integrate an integer number of burst signal cycles so that the frequency components of the second mixer output integrate to zero. The output of the second integrator 32 represents the DC signal component of the output of the second mixer 23.

To generate an error signal for the position of the transducer 21 requires the frequency translated and integrated A burst to be compared with the frequency translated and integrated B burst. The A burst and the B burst occur at different times. Therefore, a first hold circuit 31 and a second hold circuit 33 are required to synchronize in time the integrated A burst and the integrated B burst.

A comparator circuit 34 generates a position error signal from the synchronized integrated signals. The comparator circuit 34 outputs a difference signal (position error signal) that represents the difference between the amplitude of the output of the first integrator 30 and the amplitude of the output of the second integrator 32.

An actuator controller 36 receives the position error signal. The actuator controller 36 controls the position of the transducer 21 to minimize the position error signal. The S/N of the position error signal of this invention is generally greater than possible with prior servo system configurations. Therefore, the actuator controller 31 can more precisely control the position of the transducer 21.

Figure 5:
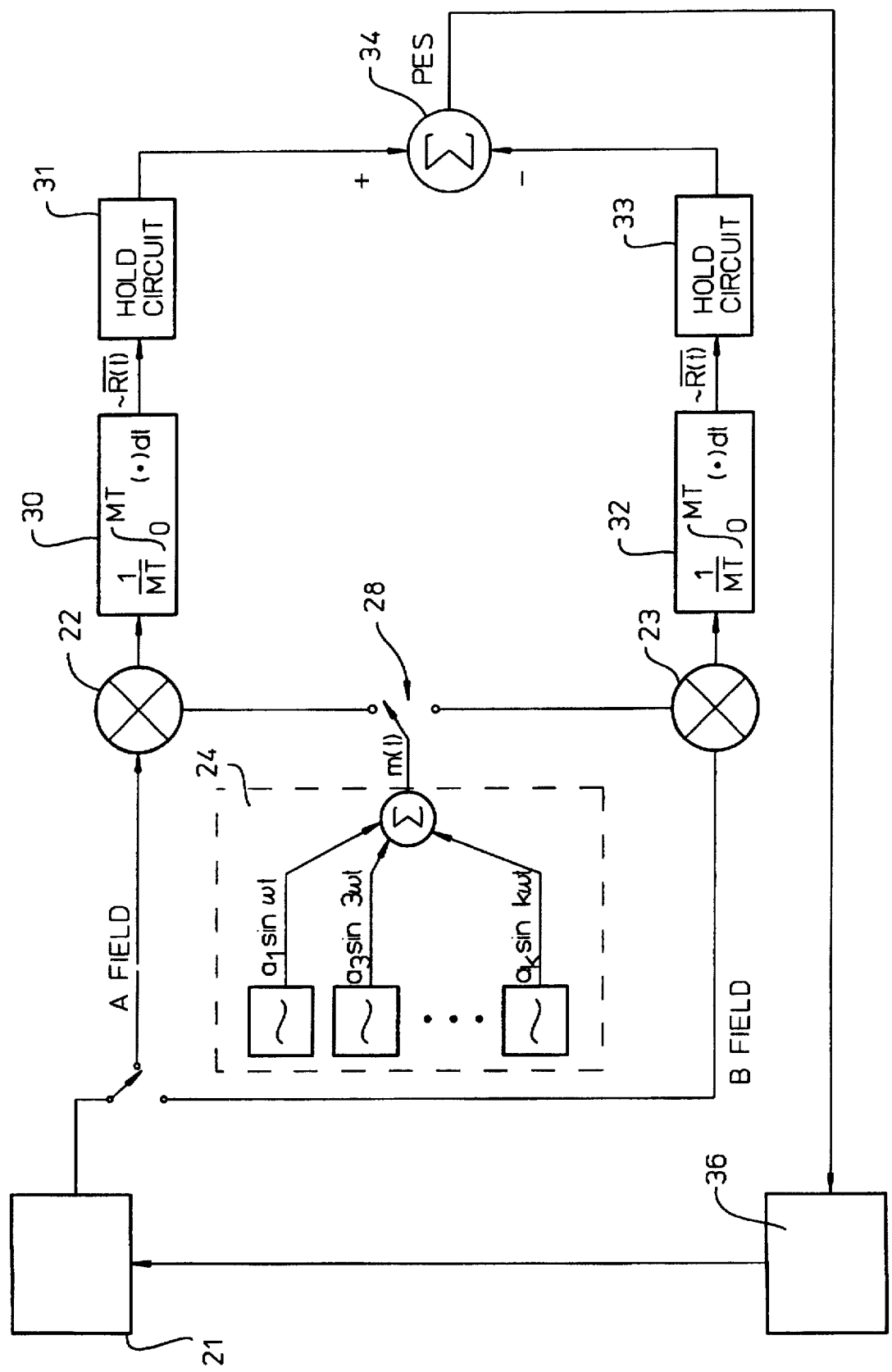
FIG. 5 shows an implementation of the synchronous servo demodulation system of this invention.

FIG. 5 shows an implementation of the synchronous servo control of this invention. For this implementation, the circuitry is essentially all analog electronic components. None of the signals within the servo demodulator are sampled during the occurrence of a burst signal. The mixer signal generated by the mixer signal generator 24 is a continuous analog waveform. The mixer signal generator 24 includes a plurality of sub-waveform generators in which the frequency of each sub-waveform generated is an integer of the frequency of either the A burst or the B burst. Each of the sub-waveforms is coherent with either the A burst or the B burst. The mixer signal is customized by constructing the mixer signal from the sub-waveform generators in which the amplitude of each sub-waveform is selected to maximize the S/N ratio of the position error signal.

Figure 6:
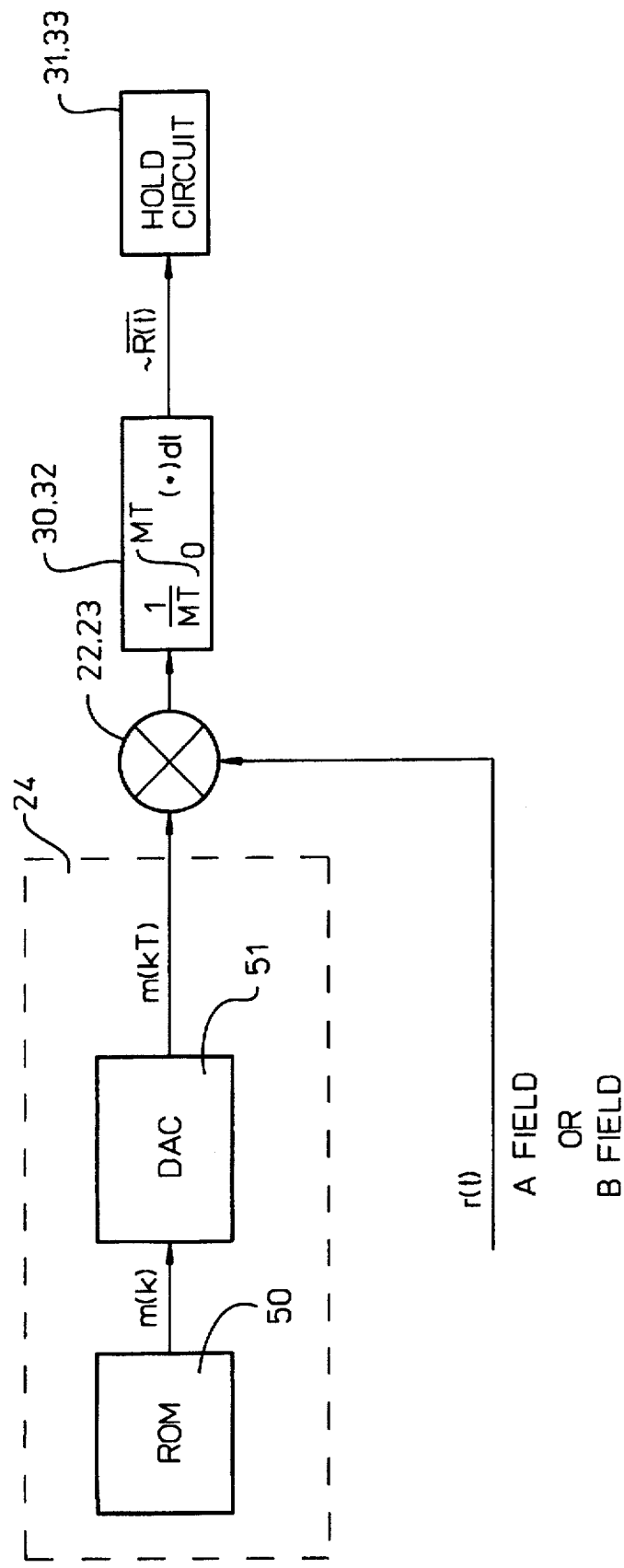
FIG. 6 shows another implementation of the synchronous servo demodulation system of this invention.

FIG. 6 shows another implementation of the synchronous servo control of this invention. The circuitry of this implementation requires both analog and digital electronic components. The mixer signal generator 24 includes a ROM 50 and a digital to analog converter (DAC) 51. The ROM 50 digitally stores values of the coherent mixer signals. A digital counter addresses the ROM 50, and therefore, controls the memory locations within the ROM 50 that are accessed. The counter is clocked with a signal that is phase locked to either the A burst signal or the B burst signal. The mixer waveforms can easily be customized and modified. Modifications and updates to the mixer waveforms are made by updating the values stored in the memory locations within the ROM 50. The DAC 51 converts the digital representation of the mixer waveform into an analog signal which drives the first mixer 22 or the second mixer 23. The transducer 21, the comparator circuit 34 and the actuator controller 36 all function the same as previously described.

Figure 7:
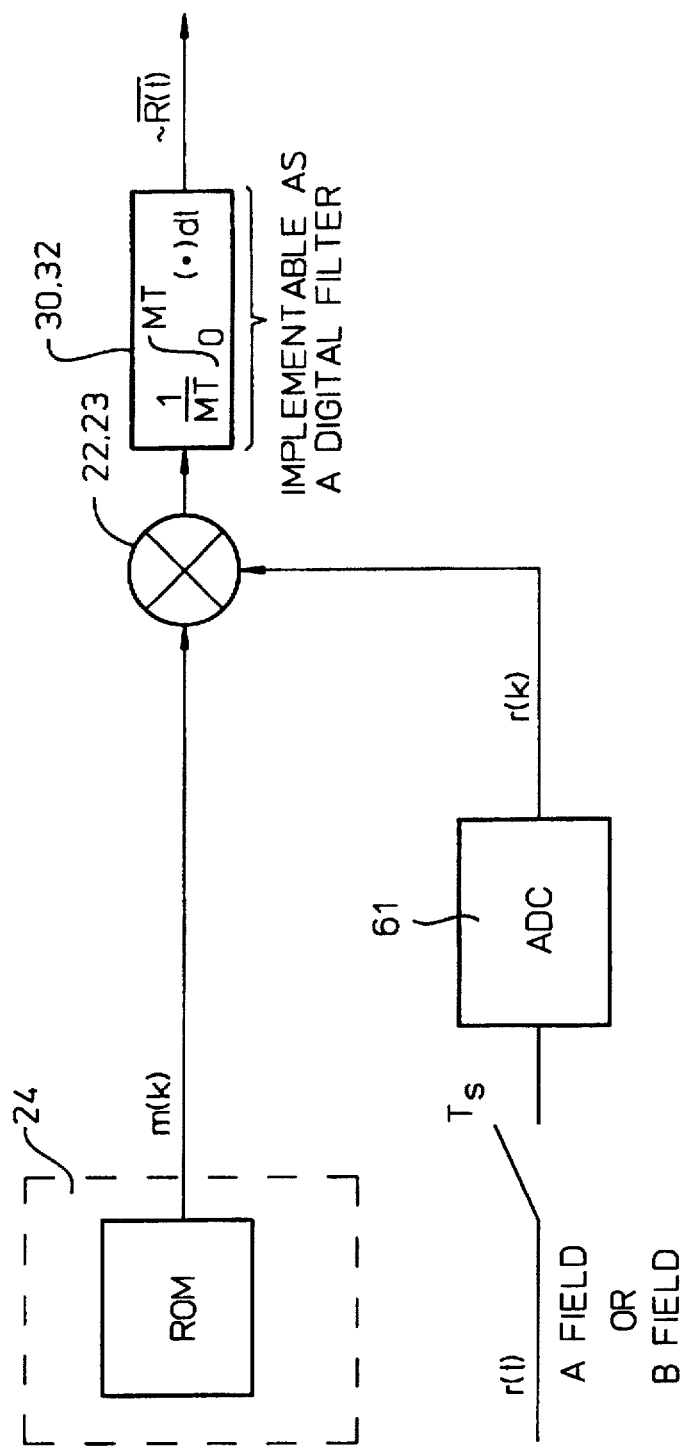
FIG. 7 shows another implementation of the synchronous servo demodulation system of this invention.

FIG. 7 shows another implementation of the synchronous servo control of this invention. This implementation includes essentially all digital electronic components. The A and B burst signals are digitally sampled by an analog to digital converter (ADC) 61. The first mixer 22 and the second mixer 23 are implemented with digital electronic circuitry. The ROM within the mixer signal generator 24 no longer requires a DAC preceding the first mixer 22 and the second mixer 23. The integrators 30, 32 are implemented with digital circuitry. Therefore, the hold circuits 31, 33 are no longer required. The transducer 21 and the comparator circuit 34 function the same as previously described.

The configurations of this invention as shown in FIGS. 5, 6 and 7 are extremely powerful because, unlike other existing methods of servo signal demodulation, they provide for demodulation of select harmonics of the A and B burst signals. Some harmonics of the burst signals can degrade the S/N ration of the position error signal.

The configurations of this invention shown in FIG. 6 and FIG. 7 have a ROM in which the desired shape of the mixer signal is stored. The values which determine the shape are stored within memory cells of the ROM. These configurations of the invention allow the shape of the mixer signal to be easily changed. Therefore, customization of the harmonics of the mixer signal is very simple.

Figure 8:
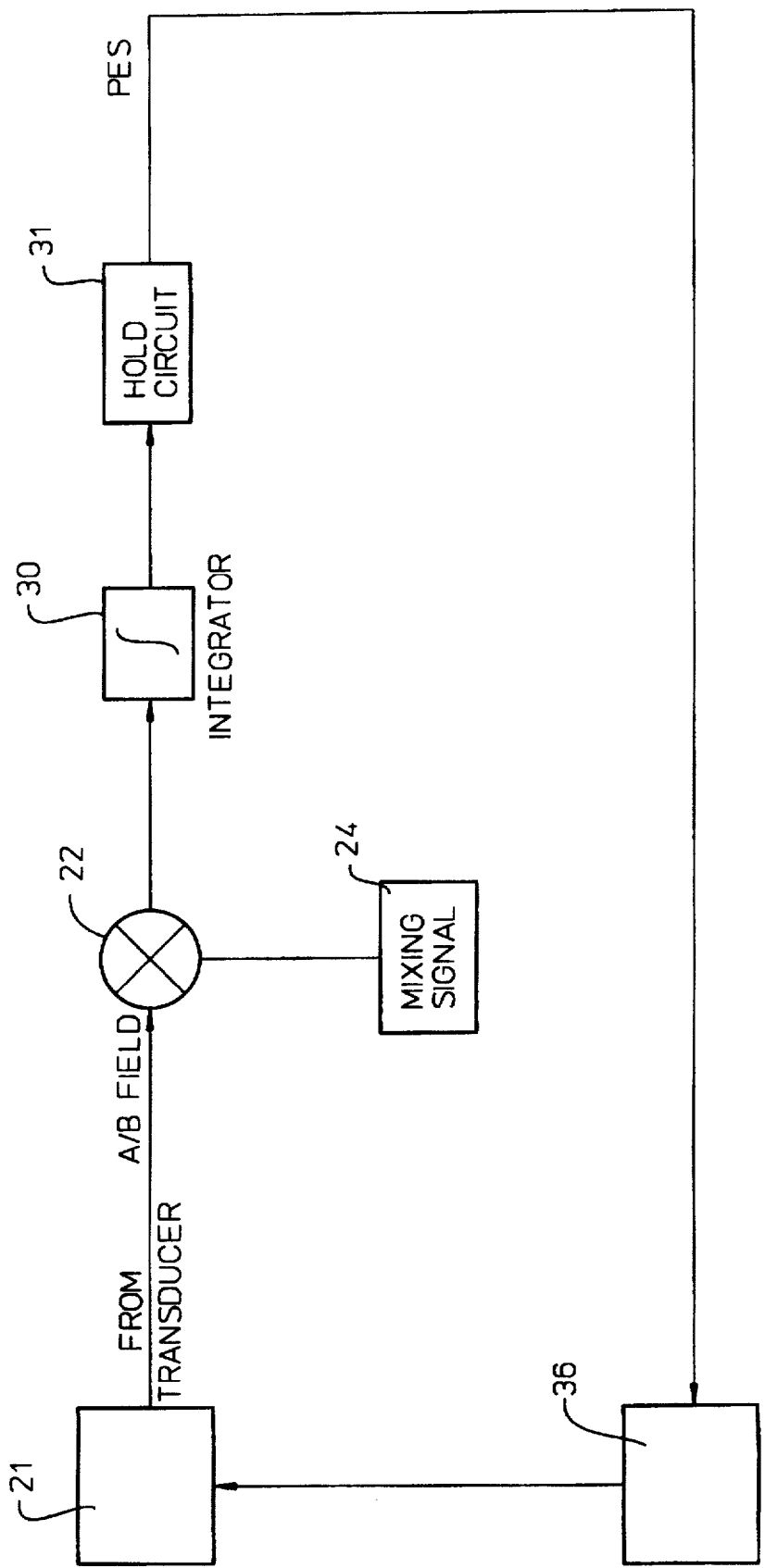
FIG. 8 shows another implementation of the synchronous servo demodulation system of this invention.

FIG. 8 shows another implementation of the synchronous servo control of this invention. This implementation is adapted for a null encoded burst pattern. In this implementation, the transducer 21 produces a combination burst as the transducer 21 simultaneously passes by the A bit magnetization pattern and the B bit magnetization pattern. Therefore, only a single mixer 22 and a single integrator 30 are required. Furthermore, the mixer signal generator 24 generates a combination burst signal. The combination burst is the difference between the A burst and the B burst. Therefore, the comparator circuit 34 is not required.

Figure 9:
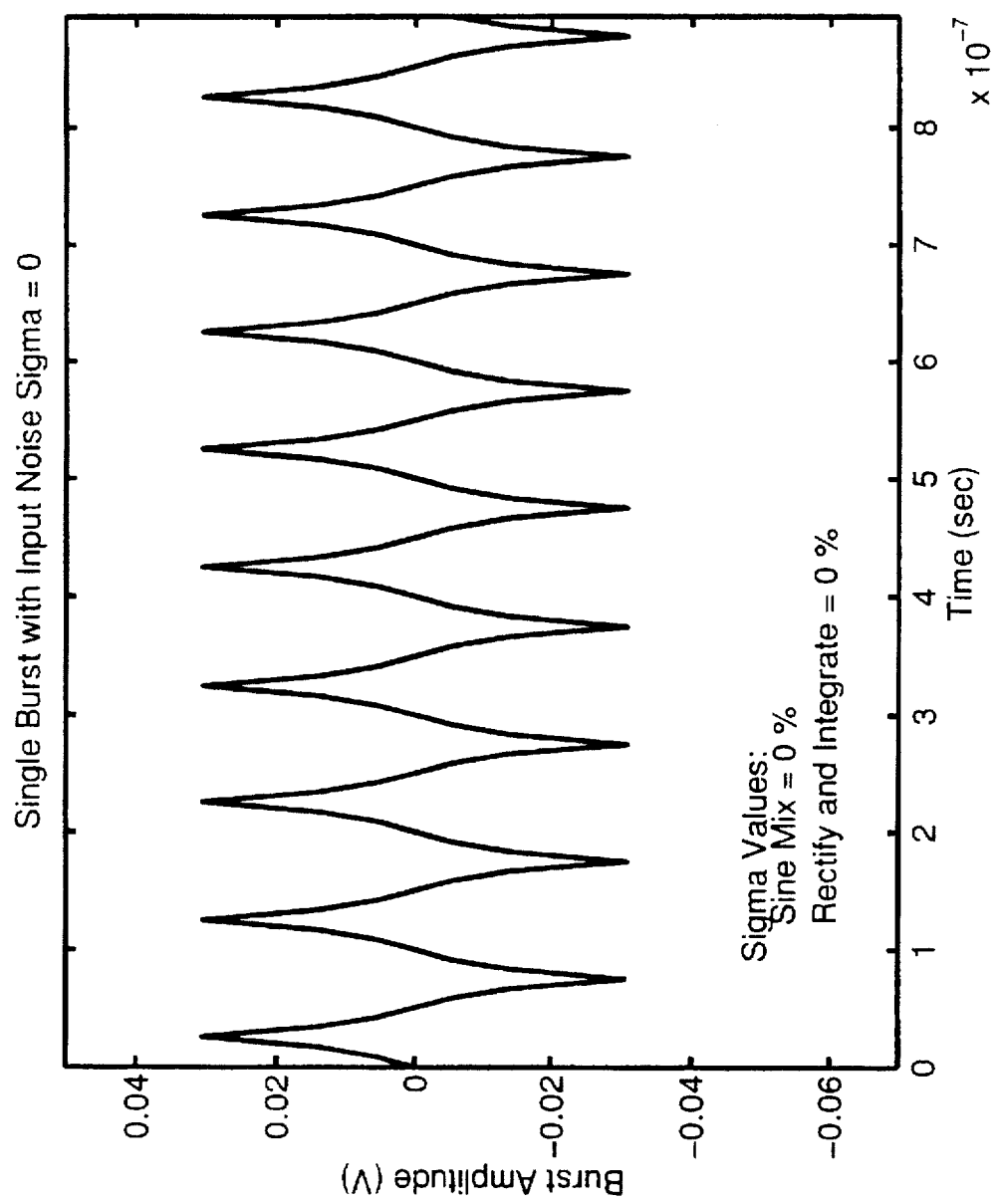
FIG. 9 shows an ideal burst signal which is used to simulate the performance of this invention.
Figure 10:
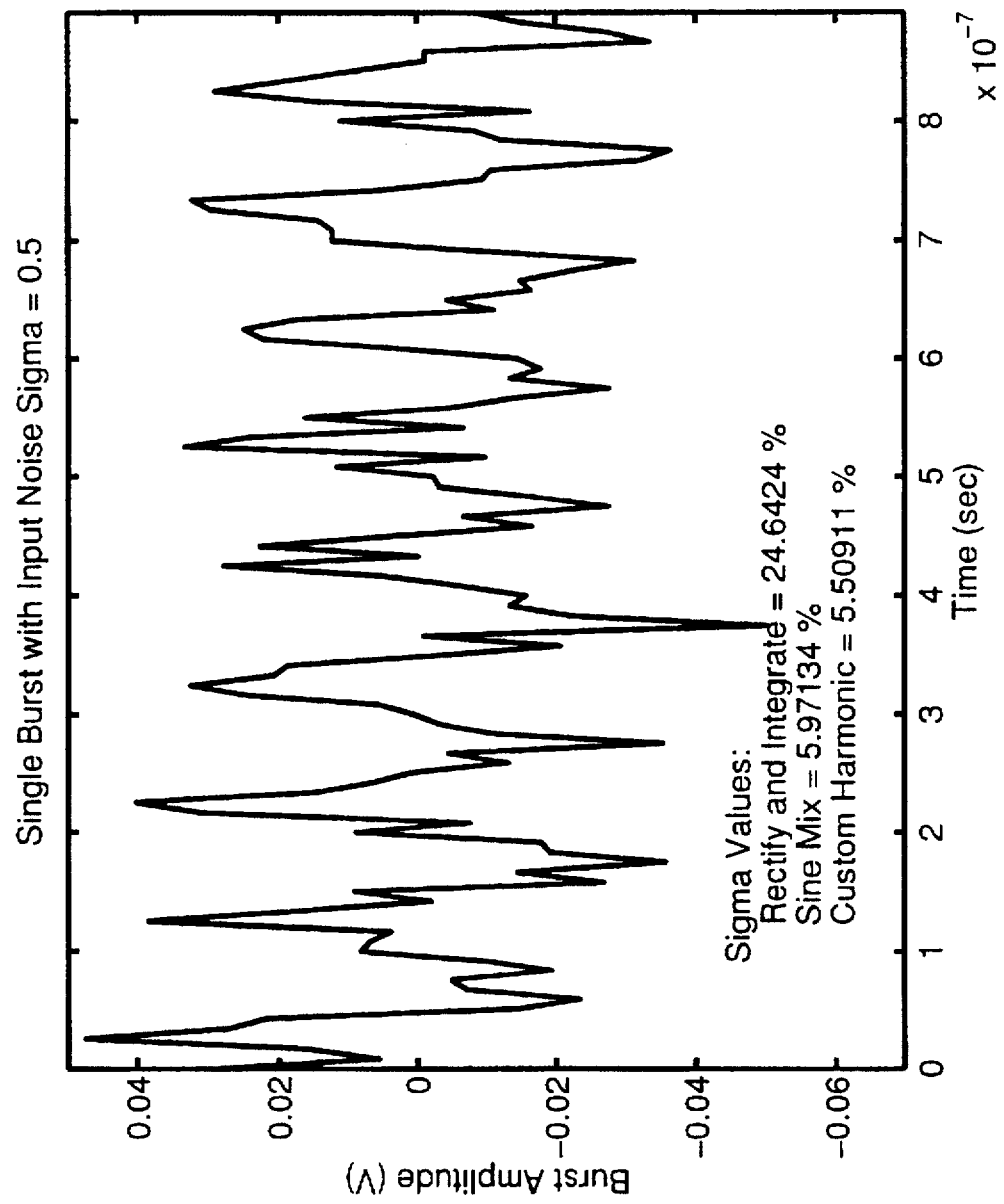
FIG. 10 shows a noisy burst signal which is used to simulate of the performance of this invention.

The improvement in S/N ratio of the position error signal of a servo system offered by this invention can be depicted through a simulated comparison with the prior art. FIG. 9 shows an ideal A or B burst signal in which the burst consists of nine cycles. The number of cycles corresponds to the number of bits within the A or B bit magnetization pattern stored on the surface of the disk. FIG. 10 shows an A or B burst signal with white noise added to the bursts.

Figure 11:
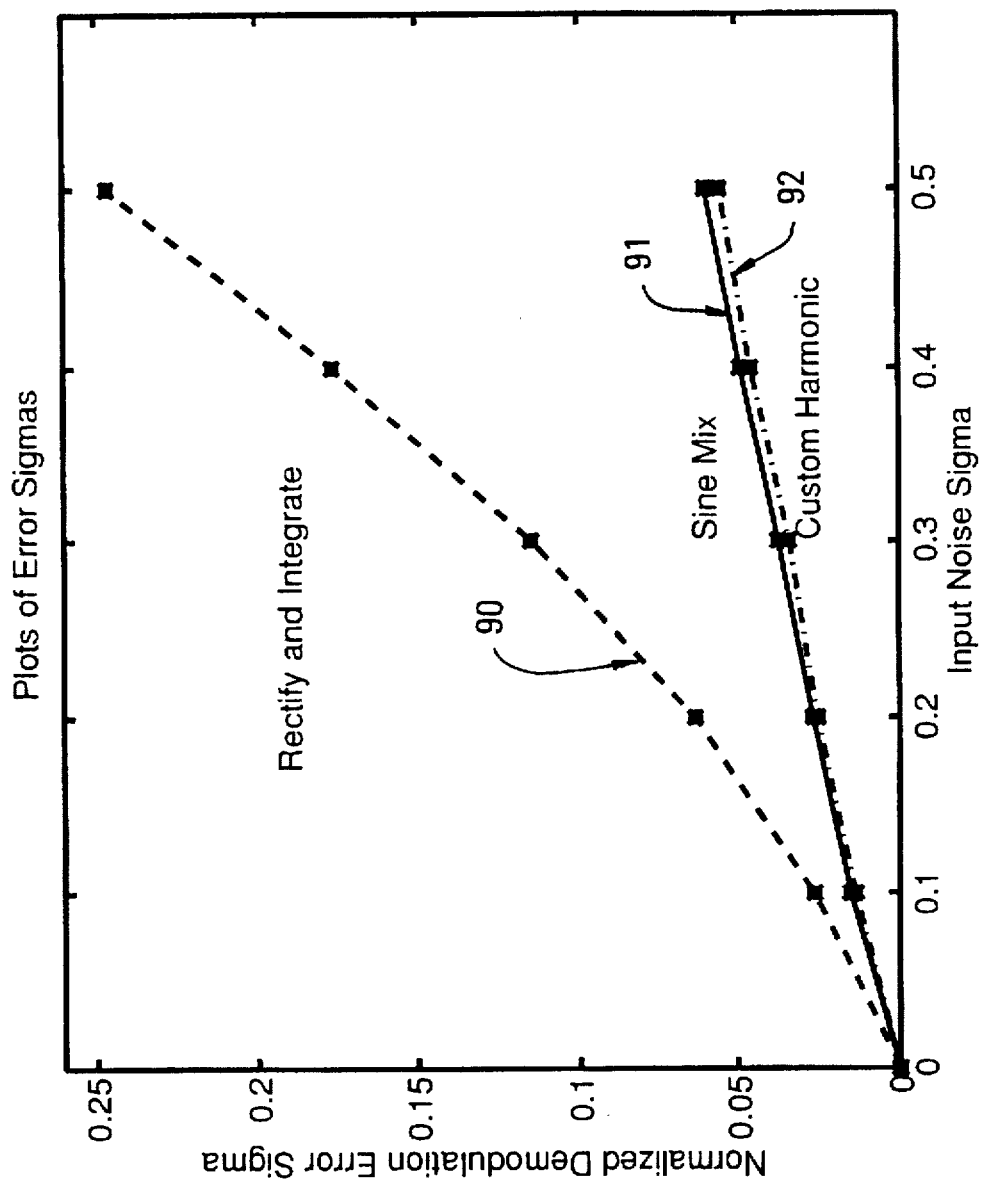
FIG. 11 is a plot that shows simulated results of the error of the position error signal when the burst signal is noisy as shown in FIG. 10, for the prior art and for this invention.

FIG. 11 is a plot that depicts the simulated error in the position error signal as a function of noise on the A and B burst signals. For this simulation, the noisy burst signal of FIG. 10 is used. Three different curves 90, 91, 92 are shown in which each curve depicts the response of a different servo demodulation configuration. The first curve 90 depicts the error on the position error signal for the rectify and integrate configuration for servo demodulation of the prior art. The second curve 91 depicts the error on the position error signal for this invention if the mixer signal generated by the mixer signal generator 24 consists of only the fundamental harmonic of the ideal burst signal. The third curve 92 depicts the error on the position error signal for this invention if the mixer signal generated by the mixer signal generator 24 consists of a weighted sum of the first, third and fifth harmonics of the ideal burst signal. The amplitudes of the harmonics of the mixer signal are proportional to the amplitudes of the harmonics of the ideal burst signals.

The third curve 92 depicts the least amount of error in the position error signal. The first curve 90 depicts the greatest amount of error in the position error signal. Therefore, this simulation suggests that this invention offers a substantial reduction in the error on the position error signal within a disk drive servo system. The third curve 92 depicts less error in the position error signal that the second curve 91. This suggests that an optimization of more harmonics than just the fundamental harmonic of the burst signal yields less error on the position error signal.

Often, the transducer used for reading the position information from the disk drive surface is a Magneto-Resistive (MR) transducer. The MR transducer can have one of several non-ideal characteristics. Some of these non-ideal characteristics include baseline shift, thermal asperity, baseline popping and second harmonic distortion. Each of the non-ideal characteristic cause errors in the position error signal. Experimentally it has been determined that this invention produces position error signals with higher S/N than prior servo system configurations in the face of these non-ideal characteristics of the MR transducer.

Figure 12:
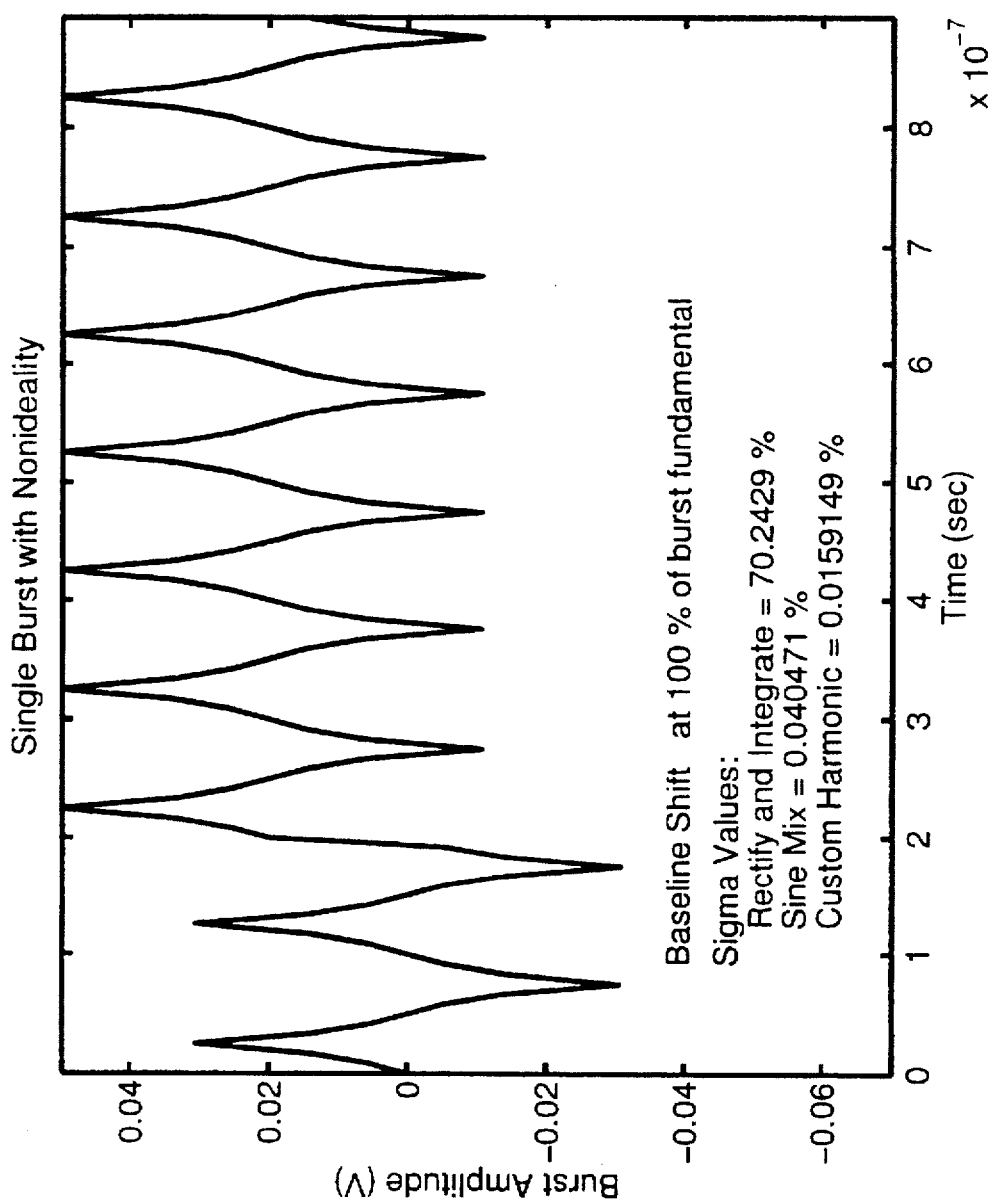
FIG. 12 shows a burst signal which has a baseline shift.

Baseline shift is a non-ideal behavior of the MR transducer in which the DC reference of the MR transducer shifts. The output of the MR transducer ideally comprises the dibit burst signal in which the dibit signal comprises the A burst and B burst without any DC components. However, MR transducers will sometimes add a DC component which shifts the voltage level of the dibit burst signal. This DC component can decrease the accuracy of the position error signal. FIG. 12 shows a burst signal in which a DC component is added to the burst signal on the occurrence of the third cycle of the burst signal.

Figure 13:
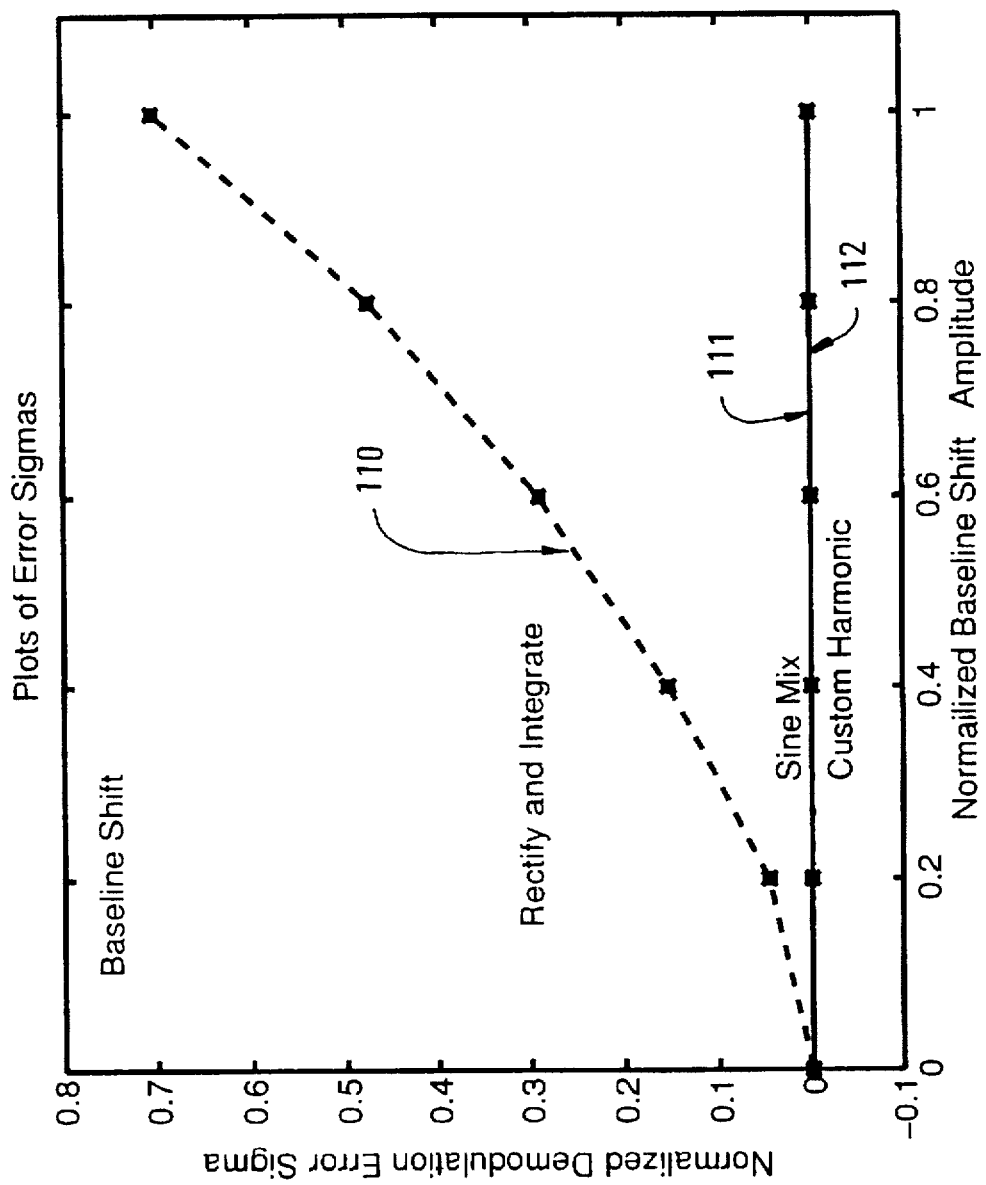
FIG. 13 is a plot that shows simulated results of the error of the position error signal when the burst signal has a baseline shift as shown in FIG. 12, for the prior art and for this invention.

FIG. 13 shows simulated results of the error of the position error signal when the MR transducer has a baseline shift. The first curve 110 depicts the error on the position error signal for the rectify and integrate configuration for servo demodulation of the prior art. The second curve 111 depicts the error on the position error signal for this invention if the mixer signal generated by the mixer signal generator 24 consists of only the fundamental harmonic of the ideal burst signal. The third curve 112 depicts the error on the position error signal for this invention if the mixer signal generated by the mixer signal generator 24 consists of a weighted sum of the first, third and fifth harmonics of the ideal burst signal.

The third curve 112 and the second curve 111 depict the least amount of error in the position error signal. The first curve 110 depicts the greatest amount of error in the position error signal. Therefore, this simulation suggests that this invention offers a substantial improvement in reduction of errors on the position error signal within a disk drive servo system. The third curve 112 depicts slightly less error in the position error signal that the second curve 111. The improvement is so small that it can not be observed on FIG. 13. However, this simulation suggests that an optimization of more harmonics than just the fundamental harmonic of the burst signal yields slightly less error on the position error signal when the transducer has a baseline shift.

Figure 14:
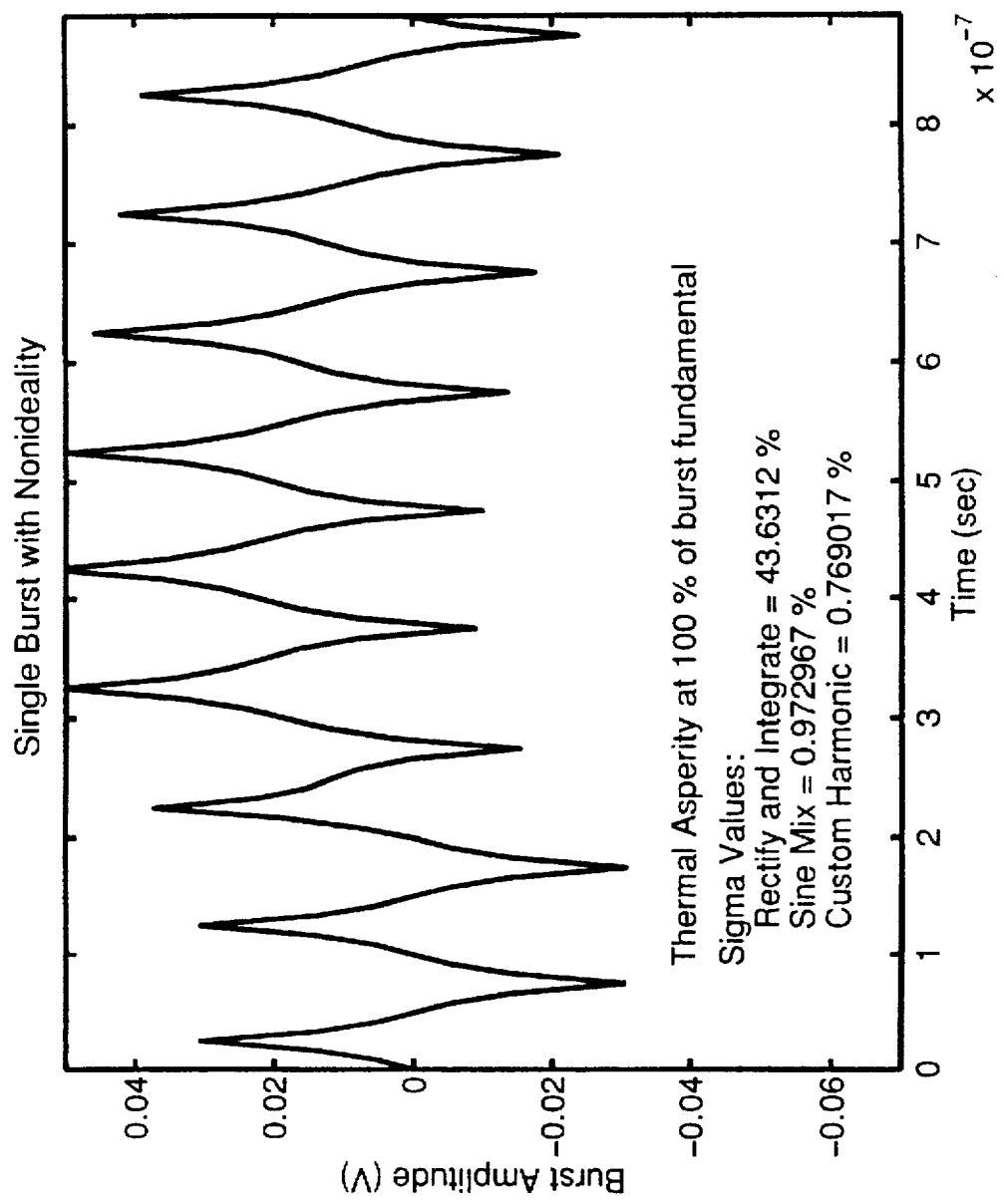
FIG. 14 shows a burst signal which has been generated from a transducer that has thermal asperity.

Thermal asperity is a characteristic of MR transducers in which the resistance of the MR transducer varies with temperature. A recording head having an MR transducer can heat up due to friction when the recording head hits a bump on the magnetic surface the recording head is magnetically coupled to. The MR transducer will heat up and the resistance of the MR transducer will vary. The variance in the resistance of the MR transducer directly affects the accuracy of the dibit burst signal at the output of the MR transducer. FIG. 14 depicts a signal burst similar to the shape of a signal burst generated by an MR transducer that has thermal asperity.

Figure 15:
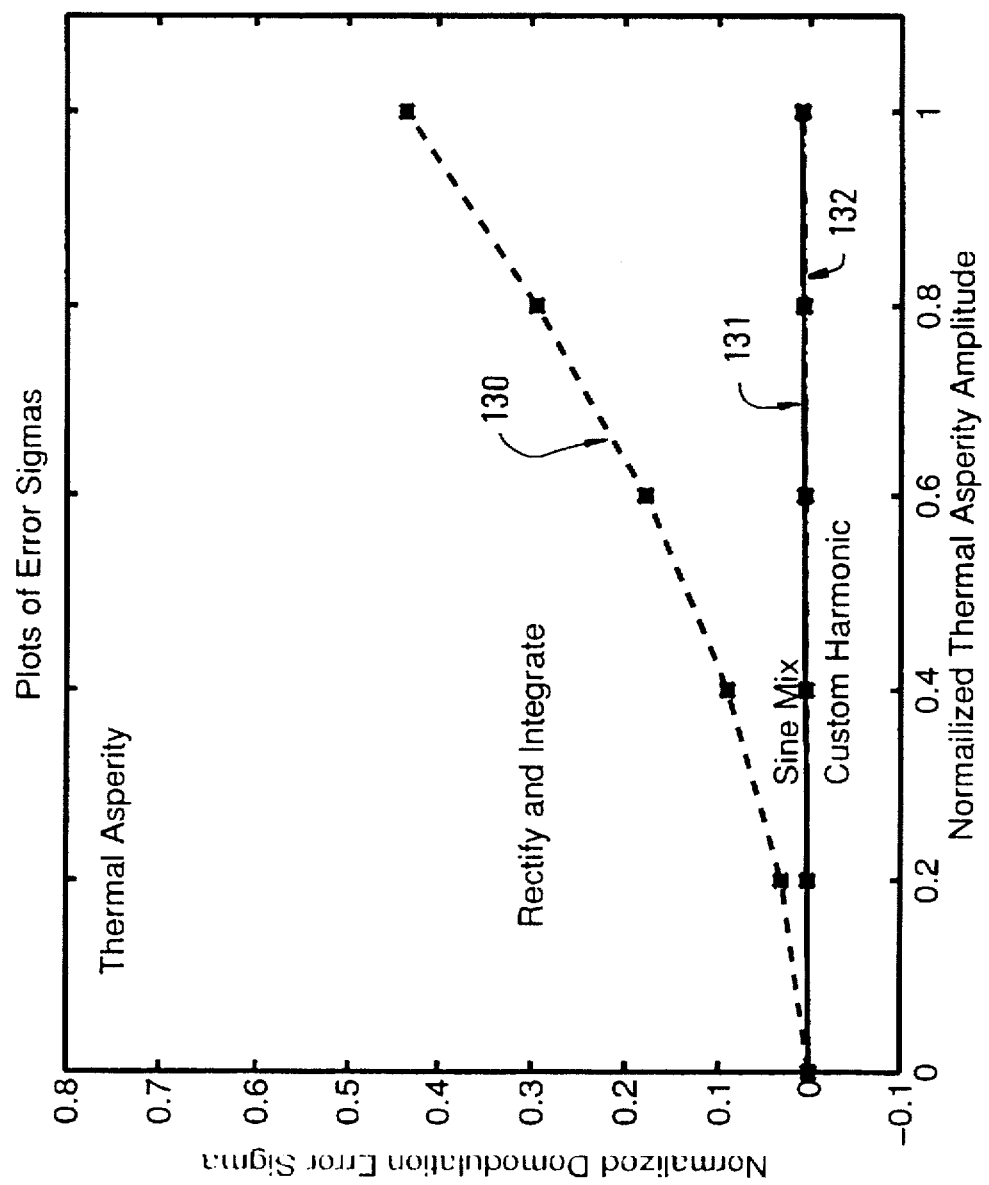
FIG. 15 is a plot that shows simulated results of the error of the position error signal when the burst signal has been generated from a transducer that has thermal asperity as shown in FIG. 14, for the prior art and for this invention.

FIG. 15 shows simulated results of the error of the position error signal when the MR transducer has a thermal asperity. The first curve 130 depicts the error on the position error signal for the rectify and integrate configuration for servo demodulation of the prior art. The second curve 131 depicts the error on the position error signal for this invention if the mixer signal generated by the mixer signal generator 24 consists of only the fundamental harmonic of the ideal burst signal. The third curve 132 depicts the error on the position error signal for this invention if the mixer signal generated by the mixer signal generator 24 consists of a weighted sum of the first, third and fifth harmonics of the ideal burst signal.

The third curve 132 and the second curve 131 depict the least amount of error in the position error signal. The first curve 130 depicts the greatest amount of error in the position error signal. Therefore, this simulation suggests that this invention offers a substantial improvement in reduction of errors on the position error signal within a disk drive servo system. The third curve 132 depicts slightly less error in the position error signal that the second curve 131. The improvement is so small that it can barely be observed on FIG. 15. However, this simulation suggests that an optimization of more harmonics than just the fundamental harmonic of the burst signal yields slightly less error on the position error signal when the transducer has a thermal asperity.

Figure 16:
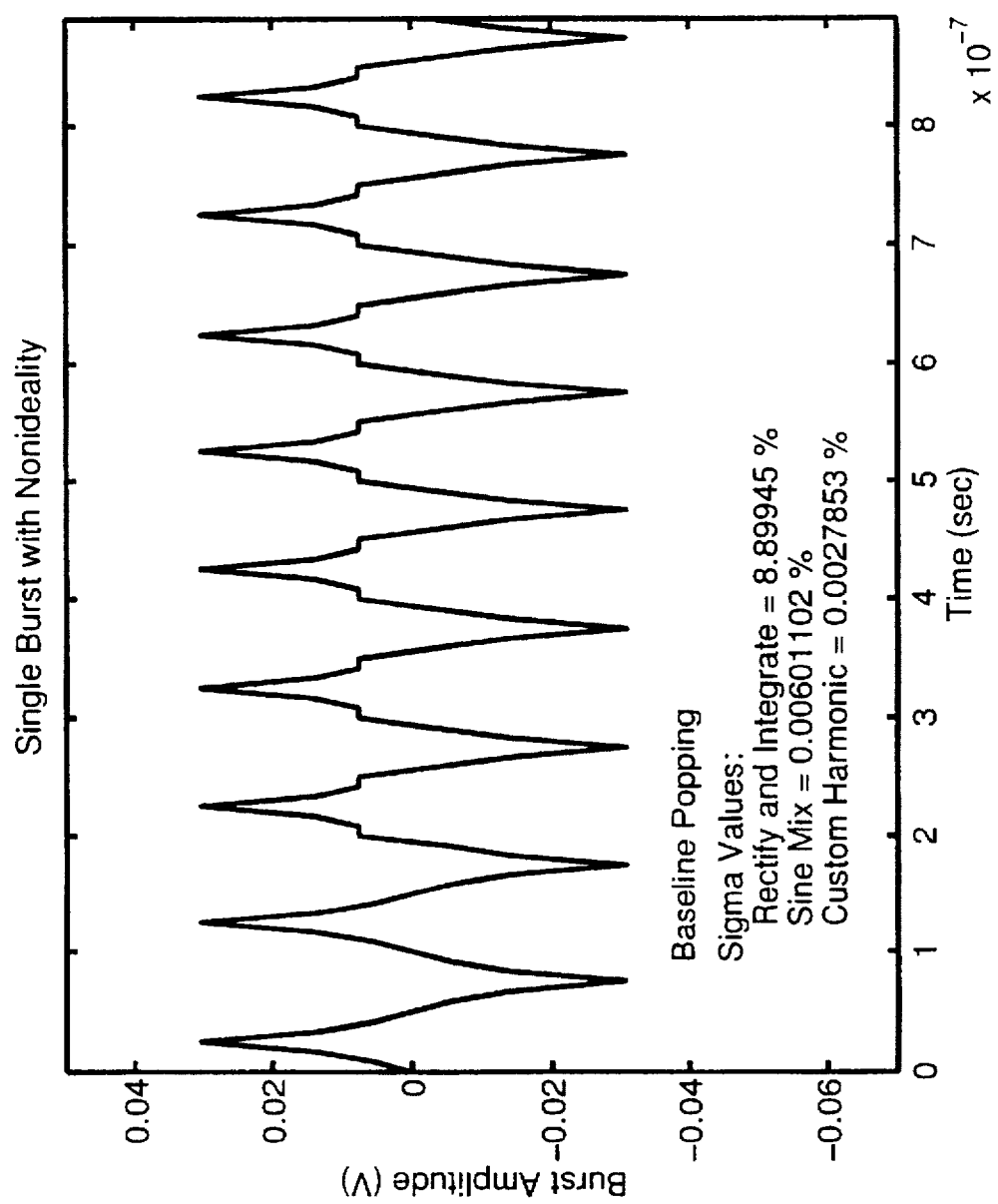
FIG. 16 shows a burst signal which has been generated from a transducer that has baseline popping.

Baseline popping is another phenomena of the MR transducer that can affect the DC component within the dibit burst signal at the output of the MR transducer. FIG. 16 depicts a burst signal generated from an MR transducer which has baseline popping. The baseline popping phenomena is extremely difficult to simulate. However, the phenomena creates a shift in the DC value of the burst signals without affecting the peak values of the burst signals. Intuitively, it can be reasoned that the rectify and integrate method of servo demodulation will be less accurate than a synchronous servo demodulation system because the burst signal lacks symmetry and a DC component has been added to the burst signal.

Figure 17:
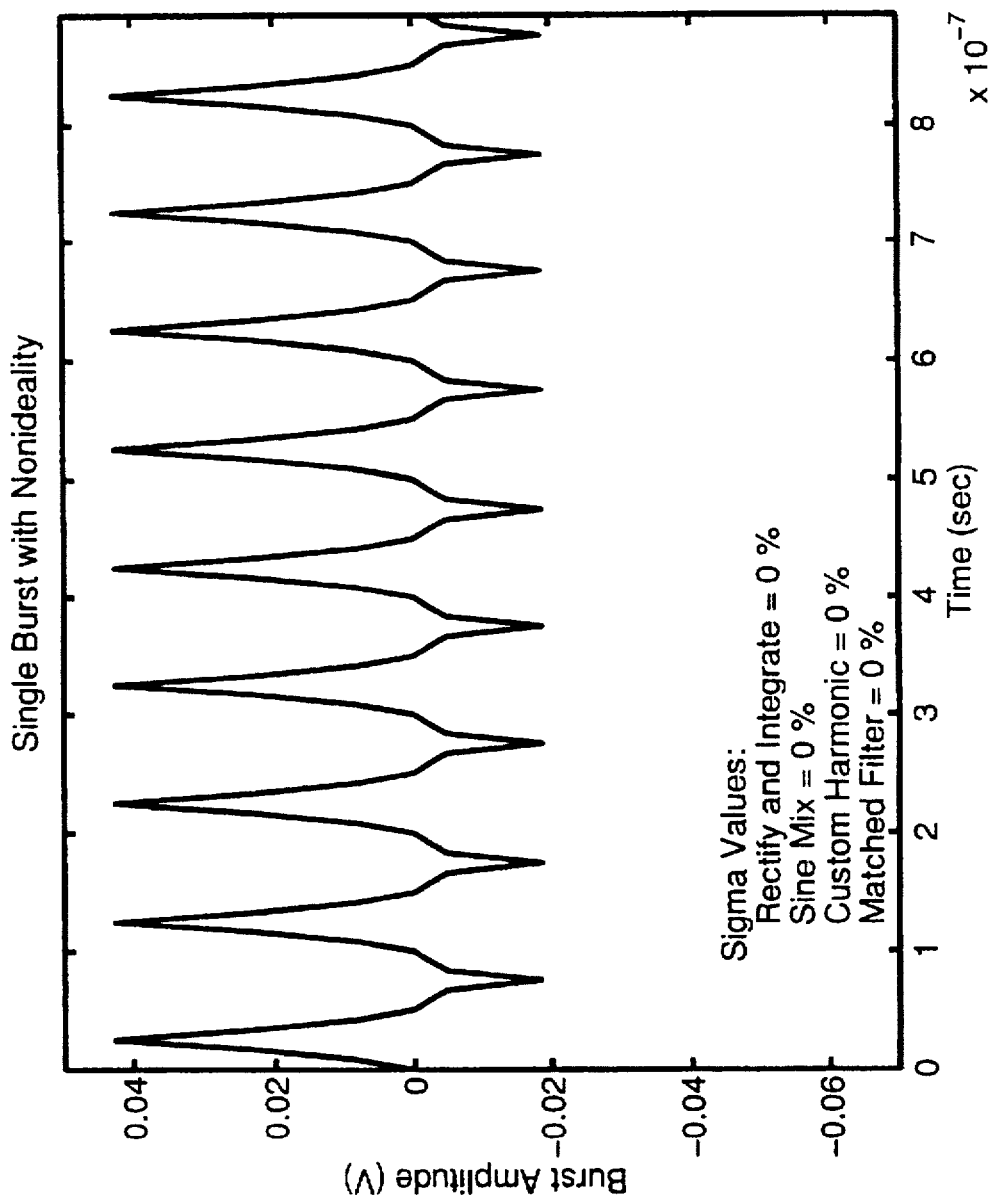
FIG. 17 shows an optimally shaped burst signal produced by a transducer which can not produce the ideal burst signal as shown in FIG. 9 and which inherently has second harmonic distortion in the burst signal.

Ideally, the response of the MR transducer is linear and the transducer can produce the ideal burst signal shown in FIG. 9. However, many types of MR transducers do not have a linear response and inherently add some second harmonic distortion. Therefore, an optimally biased MR transducer can have some second harmonic distortion. FIG. 17 shows a burst signal produced by an optimally biased MR transducer in which the transducer does not have a linear response. The burst signal shown in FIG. 17 is the best shaped burst signal that some transducers can produce.

Additionally, a non-optimally biased MR transducer will add even greater amounts of second harmonic distortion. The effects of the second harmonic distortion can be minimized by customizing the coherent mixer waveform so that the distorted second harmonic of the burst signals is not demodulated.

Figure 18:
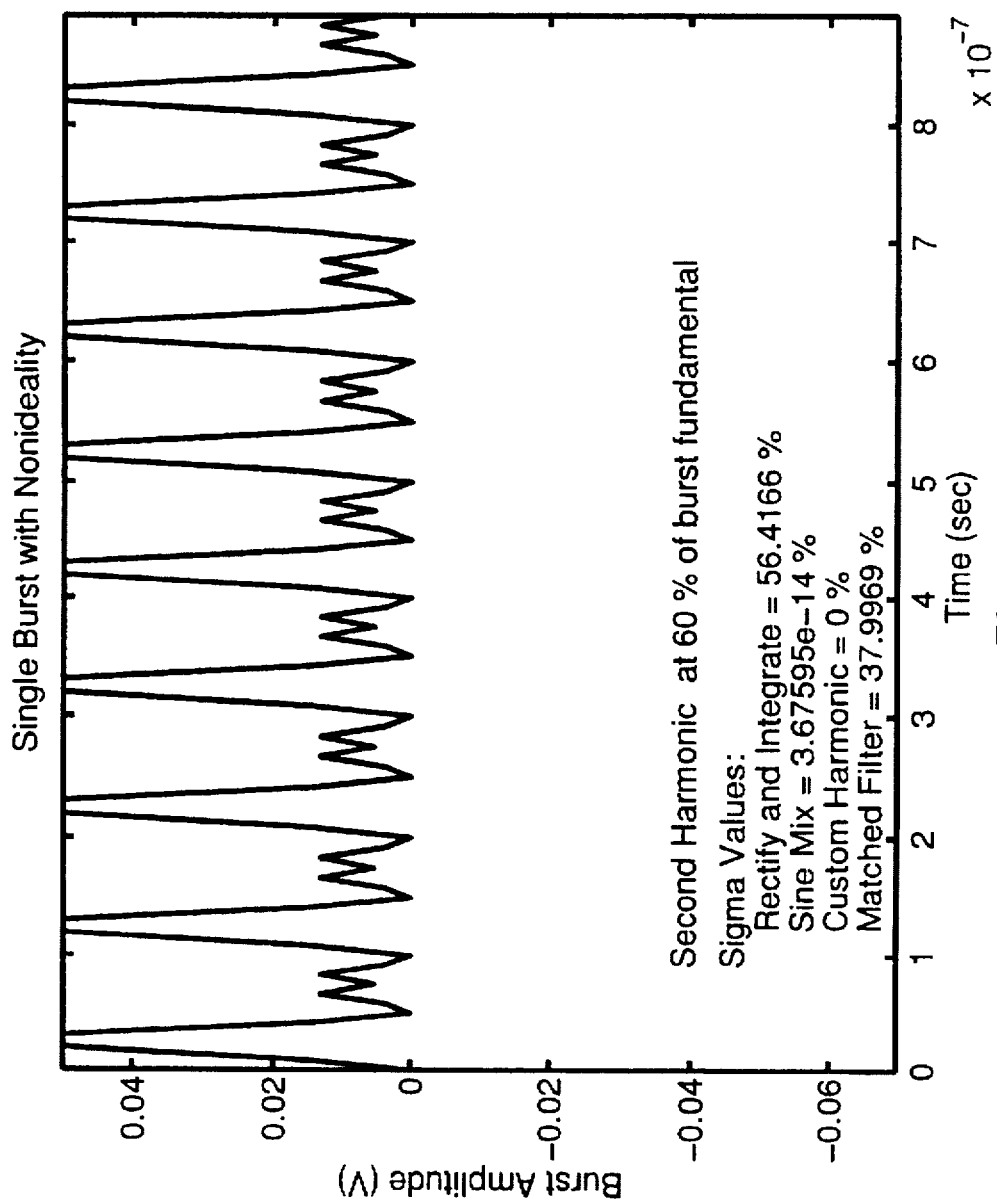
FIG. 18 shows a burst signal generated by the same transducer which produced the burst shown in FIG. 17 in which the second harmonic distortion is greater than in FIG. 17 because the transducer producing the burst signal is not biased properly.

FIG. 18 shows a noise free burst signal that has even more second harmonic distortion than the burst signal shown in FIG. 17. The additional second harmonic distortion of this waveform is due to the non-ideal MR transducer being non-optimally biased.

Figure 19:
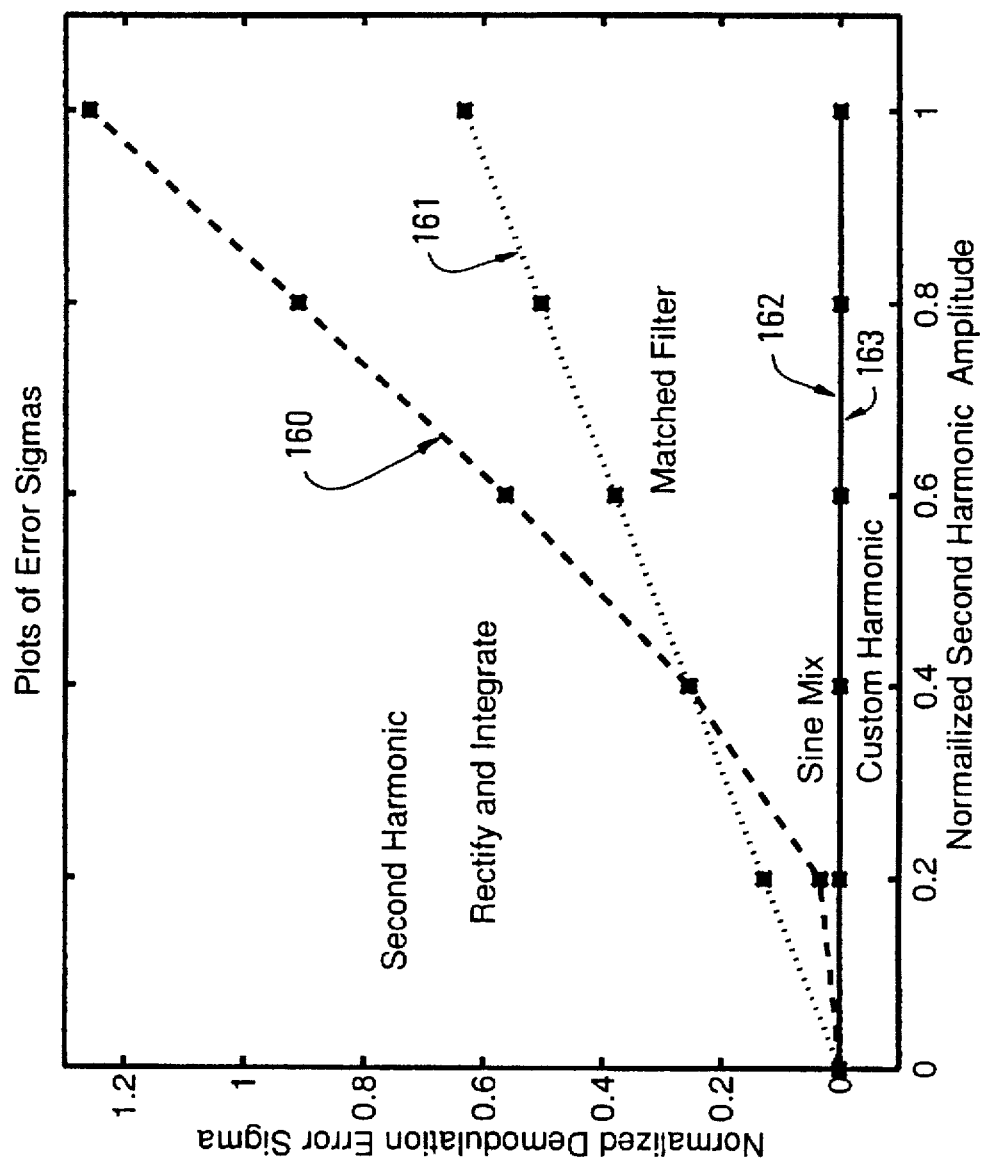
FIG. 19 is a plot that shows simulated results of the error of the position error signal when the burst signal has second harmonic distortion as shown in FIG. 18 and the mixing signals are based on the burst signal in FIG. 17, for the prior art and for this invention.

FIG. 19 shows simulated results of the error of the position error signal when the MR transducer is improperly biased and the burst signal has second harmonic distortion as shown in FIG. 18. This plot depicts the error in the position error signal as a function of the amplitude of the second harmonic of the burst signal. The first curve 160 depicts the error on the position error signal for the rectify and integrate configuration for servo demodulation of the prior art. The second curve 161 depicts the error on the position error signal for this invention if the mixer signal generated by the mixer signal generator 24 consists of all the harmonics of the burst signal shown in FIG. 17 including the second harmonic. The third curve 162 depicts the error on the position error signal for this invention if the mixer signal generated by the mixer signal generator 24 consists of only the fundamental harmonic of the burst signal of FIG. 17. The fourth curve 163 depicts the error on the position error signal for this invention if the mixer signal generated by the mixer signal generator 24 consists of a weighted sum of the first, third and fifth harmonics of the burst signal shown in FIG. 17. This simulation shows that mixing the burst signal with an ideal replication of the burst signal does not yield the best results. A customized version of the replicated burst signal (such as the first, third and fifth harmonics) as the mixing signal will yield the best servo demodulation performance.

The fourth curve 163 and the third curve 162 depict the least amount of error in the position error signal. The first curve 160 depicts the greatest amount of error in the position error signal. The second curve 161 also depicts a greater amount of error than the fourth curve 163 and the third curve 164. Therefore, this simulation suggests that this invention offers a substantial improvement in reduction of errors on the position error signal within a disk drive servo system and that the optimal mixing signal in this case does not demodulate the second harmonic of the burst signal. The fourth curve 163 depicts about the same error in the position error signal as the third curve 162.

For each of the simulations of the position error signal in which the MR transducer has a non-ideal characteristic, no random noise was included within the simulated burst signals. Furthermore, each burst had nine cycles and the non-ideal characteristic started on the third cycle of the burst.

Each of the simulations included a mixing signal which consisted of sine waves only. However, this invention can also be practiced with mixing signals which consist of cosine waves only or a mixture of sine and cosine waves. If the mixing signal consists of a mixture of sine and cosine waves, I-Q demodulation may be used to demodulate the burst signals and determine a representation of the position of the transducer with respect to the magnetic surface of the disk. This may be of use when there is a residual (fixed) phase shift between the burst signal and the mixing signal.

The coherent mixer waveform generated by a mixer signal generator 24 can be modified and characterized to provide optimal performance. Therefore, if other not yet discovered non-ideal characteristics of components within the servo loop limit the performance of the servo loop, it may be possible to configure the coherent mixer waveform to minimize the effects of the non-ideal characteristics.

Although specific embodiments of the invention have been described and illustrated, the invention is not to be limited to the specific forms or arrangements of parts so described and illustrated. The invention is limited only by the claims.

What is claimed is:

1. A magnetic recording device comprising:
   a rotatably mounted disk having a surface containing recording tracks, each track comprising a plurality of first reference position dibits at selected positions along the track and, spaced apart from the first reference position dibits, a plurality of second reference position dibits at selected positions along the track;
   a transducer coupled to the surface for following a track and producing a first dibit burst signal when the transducer passes by the first reference position dibits along the track and a second dibit burst signal when the transducer passes by the second reference position dibits along the track, the amplitude of each dibit burst signal dependent on the position of the transducer with respect to the track;
   mixing signal means for generating a first mixing signal comprising a finite integer number of sinusoids coherent with the first dibit burst signal and a second mixing signal comprising a finite integer number of sinusoids coherent with the second dibit burst signal;
   a mixer means for multiplying the first mixing signal by the first dibit burst signal to provide a first multiplied output and the second mixing signal by the second dibit burst signal to provide a second multiplied output;
   means for generating a position error signal according to any difference between the first and second multiplied outputs; and
   means responsive to the position error signal to adjust the position of the transducer with respect to the track so as to minimize the position error signal.

2. The magnetic recording device as recited in claim 1, wherein the sinusoids are cosine waves.

3. The magnetic recording device as recited in claim 1, wherein the sinusoids are sine waves.

4. The magnetic recording device as recited in claim 1, wherein the sinusoids comprise sine waves and cosine waves.

5. The magnetic recording device as recited in claim 1, wherein the first mixing signal means comprises a mixing signal ROM storing sinusoid values, and a DAC receiving the sinusoid values from the mixing signal ROM to create the first mixing signal.

6. The magnetic recording device as recited in claim 1, wherein the first mixing signal means comprises a plurality of sub-sinusoid generators which are summed to create the first mixing signal.

7. The magnetic recording device as recited in claim 1, wherein the first dibit burst signal is time sampled, and the first frequency mixer means and the first integrator means are implemented with digital electronic circuitry.

8. The magnetic recording device as recited in claim 1, wherein the mixing means comprises:

a first frequency mixer receiving the first mixing signal and the first dibit signal, the first frequency mixer multiplying the first mixing signal and the first dibit burst signal and generating the first multiplied output; and a second frequency mixer receiving the second mixing signal and the second dibit burst signal, the second frequency mixer multiplying the second mixing signal and the second dibit burst signal and generating the second multiplied output.

9. The magnetic recording device as recited in claim 1, wherein the means for generating a position error signal comprises:

a first integrator for integrating the first multiplied output over an integer number of cycles and generating a first error signal; p1 a second integrator for integrating the second multiplied output over an integer number of cycles and generating a second error signal; and a comparator for receiving the first error signal and the second error signal and generating the position error signal.

10. The magnetic recording device as recited in claim 1, wherein the means responsive to the error signal comprises a moveable actuator connected to the transducer for moving the transducer to different radial locations with respect to the track, and an actuator controller receiving the position error signal for controlling the moveable actuator to maintain the transducer position with respect to the recording track so as to minimize the position error signal.

11. A magnetic recording device comprising:

a rotatably mounted disk having a surface containing recording tracks, each track comprising a plurality of first reference position dibits at selected positions along the track and, spaced apart from the first reference position dibits, a plurality of second reference position dibits at selected positions along the track;

a transducer coupled to the surface for following a track and producing a combined dibit burst signal when the transducer simultaneously passes by the first reference position dibits and the second reference position dibits along the track, the phase and amplitude of the combined dibit burst signal dependent on the position of the transducer with respect to the track;

mixing signal means for generating a combined mixing signal comprising a finite integer number of sinusoids coherent with the combined dibit burst signal;

a mixer means for multiplying the combined mixing signal by the combined dibit burst signal to provide a combined multiplied output;

means for generating a position error signal according to the phase and amplitude of the combined multiplied output; and means responsive to the position error signal to adjust the position of the transducer with respect to the track so as to minimize the position error signal.

12. A method of maintaining the position of a transducer with respect to a recording track on a surface of a rotatable disk, the method comprising the steps of:

a. generating a first dibit burst signal as the transducer passes over a plurality of first reference dibits located on the surface of the disk;

b. generating a second dibit burst signal as the transducer passes over a plurality of second reference dibits located on the surface of the disk;

c. multiplying the first dibit burst signal with a first mixing signal comprising a finite integer of sinusoids which are coherent with the first dibit burst signal;

d. multiplying the second dibit burst signal with a second mixing signal comprising a finite integer of sinusoids which are coherent with the second dibit burst signal;

e. integrating the multiplied first dibit burst signal over an integer number of first dibit burst signal cycles to produce a first error signal;

f. integrating the multiplied second dibit burst signal over an integer number of second dibit burst signal cycles to produce a second error signal;

g. comparing the first error signal and the second error signal to produce a difference error signal; and h. controlling a moveable actuator connected to the transducer with the difference error signal to maintain the position of the transducer with respect to the recording track.

* * * * *